United States Patent [19]

Ohishi et al.

[11] Patent Number: 4,810,941
[45] Date of Patent: Mar. 7, 1989

[54] CONTROL SYSTEM FOR A SERVOMOTOR

[75] Inventors: Shinji Ohishi; Makoto Higomura, both of Yokohama, Japan

[73] Assignee: Canon Kabushiki Kaisha, Tokyo, Japan

[21] Appl. No.: 39,019

[22] Filed: Apr. 16, 1987

[30] Foreign Application Priority Data

Apr. 17, 1986 [JP] Japan .................................. 61-87210
Apr. 17, 1986 [JP] Japan .................................. 61-87211

[51] Int. Cl.$^4$ .............................................. G05B 5/00
[52] U.S. Cl. ...................................... 318/314; 318/592
[58] Field of Search .............................. 318/309–312, 318/621, 677–680, 561, 590, 591, 592

[56] References Cited

U.S. PATENT DOCUMENTS

| | | | |
|---|---|---|---|
| 4,551,664 | 11/1985 | Wong et al. | 318/592 |
| 4,588,937 | 5/1986 | Fujioka et al. | 318/677 |
| 4,710,865 | 12/1987 | Higomura | 318/592 |

Primary Examiner—William M. Shoop, Jr.
Assistant Examiner—David S. Martin
Attorney, Agent, or Firm—Fitzpatrick, Cella, Harper & Scinto

[57] ABSTRACT

A control system for a servomotor, includes a portion for producing a driving speed controlling signal to be applied to the servomotor, a portion for producing a driving amount controlling signal to be applied to the servomotor, and a signal controlling portion for controlling the state of transmission of the driving speed controlling signal and the driving amount controlling signal to the servomotor, the signal controlling portion being effective to establish a first transmission state in which at least the driving speed controlling signal can be transmitted to the servomotor with a predetermined amplification rate and a second transmission state in which the driving speed controlling signal can be transmitted to the servomotor with an amplification rate smaller than said predetermined amplification rate while the driving amount controlling signal can be transmitted to the servomotor with a predetermined amplification rate.

11 Claims, 6 Drawing Sheets

CONTROL SYSTEM FOR A SERVOMOTOR

FIELD OF THE INVENTION AND RELATED ART

This invention relates to a control system for a servomotor and, more particularly, to a control system such as above for controlling the amount of drive of a servomotor as well as the driving speed of the servomotor.

In the field of manufacture of semiconductor devices such as integrated circuits, servomotors with controlling systems therefor are used to controllably move a movable object such as a workpiece carrying stage or a wafer stage. These servomotor controlling systems are generally arranged so that the object is moved in a speed controlling mode to a position in the neighborhood of a desired stop position (target position) and, thereafter, is moved in a position controlling mode to the desired stop position.

Figure 1:
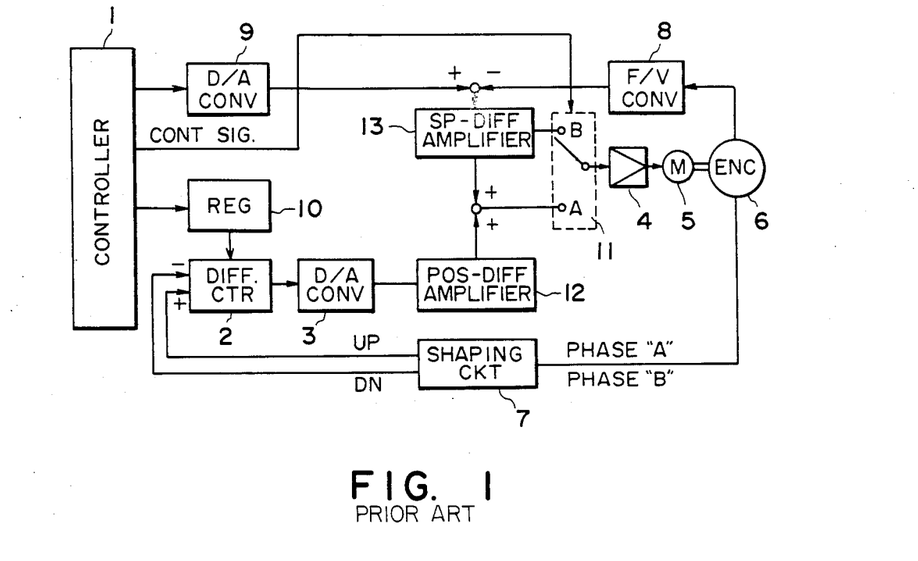
FIG. 1 is a block diagram of a known type servomotor controlling system.

FIG. 1 is a block diagram showing an example of such servo motor controlling system. As shown in FIG. 1, the system includes a system controller 1 which is arranged to produce speed-instructing signals, data concerning the target position (desired stop position), and control signals to be used for changing the control mode. As for the target position data, the controller 1 produces a signal specifying the distance through which the object should move to the target position from its current position assumed at the time of start of the motor driving. The system further includes a differential counter 2, a digital-to-analog converter 3 (hereinafter "D/A converter") for converting the output of the counter 2 into an electric voltage, a motor driver 4 and a servomotor 5. The driver 4 is adapted to supply the servomotor 5 with an electric current of an amount that is effective to cause the servomotor 5 to generate a driving torque corresponding to the electric voltage applied to the driver 4. The system further includes a digital encoder 6 responsive to the motor drive to produce dual phase signals, a wave-shaping circuit 7 for discriminating the moving direction on the basis of the dual phase signals of the encoder 6 and producing an up or down pulse train in accordance with the moving direction, a frequency-to-voltage converter 8 (hereinafter "F/V converter") for converting a feedback pulse train into an electric voltage, a digital-to-analog converter 9 (hereinafter "D/A converter") for converting the speed-instructing signals from the controller 1 into a variable speed-instructing voltage, a register 10 for storing therein the target position data supplied from the controller 1, an analog switch 11 operable to change the control mode, a positional-difference or positional-error amplifier 2 for amplifying the electric voltage outputted from the D/A converter 3 and corresponding to the positional difference or positional error, and a speed-difference or speed-error amplifier 13 for amplifying an electric voltage which corresponds to the difference between the output of the F/V converter 8 and the D/A converter 9 and which, therefore, corresponds to the speed error.

First, in operation, the controller 1 produces a control signal to cause the switch 11 to select a terminal B, and also produces speed instructing signals. These speed instructing signals are applied to the D/A converter 9, whereby a speed instructing voltage which is variable in accordance with the instructions from the controller 1 is produced. The F/V converter 8 receives a feedback pulse train outputted from the digital encoder 6 (which may be a pulse encoder), mounted to the servomotor 5, and after the frequency-to-voltage conversion it produces an electric voltage representing the current speed of the servomotor 5. The difference between the speed instructing voltage from the converter 9 and the current-speed representing voltage from the converter 8 (i.e. a speed-error voltage) is amplified by the speed-error amplifier 13. The output of the amplifier 13 is applied to the driver 4 as a motor controlling voltage, whereby the servomotor 5 is driven in the speed controlling mode until the object, such as a wafer stage, reaches a position in the neighborhood of the target position.

After completion of the speed control, the controller 1 produces a control signal, causing the switch 11 to select another terminal A. By this, a position controlling mode is established. In this position controlling mode, the counter 2 and the converter 3 operate so as to precisely stop the object at the position as set in the target-position register 10 under the influence of the controller 1. More specifically, the counter 2 counts the pulses in the feedback pulse train from the encoder 6 thereby to obtain positional information concerning the position of the object. At the same time, the counter 2 detects the difference (positional error) between the thus obtained current position of the object and the desired stop position as set in the register 10. Such error component is subjected to the digital-to-analog conversion by means of the D/A converter 3, whereby a positional-error voltage is produced. This voltage is amplified by the amplifier 12, and the thus amplified voltage is applied to the driver 4 as a motor controlling voltage (which, in this case, an electric voltage that instructs a corresponding amount of drive of the servo motor), such that the servo motor 5 is driven in accordance with this voltage.

In the position controlling mode, as seen from FIG. 1, the speed-error voltage is added to the positional-error voltage, in order to suppress oscillation of the position controlling system to thereby stabilize the same, i.e. for the purpose of phase compensation of the control system. The application of the speed-error voltage is effective to produce a "braking force" which increases with the increase in the speed. As a result, there is caused "viscosity" (phase margin) in the position controlling system. By providing such phase margin, the oscillatory movement of the object, before it is stopped at the desired position, can be made minimum. To obtain such a stable position-controlling system, the speed-error amplifier 13 and the positional-error amplifier 12 may be adjusted so that the speed controlling system has a loop gain which is approximately equal to one-third of the loop gain of the position controlling system.

With such arrangement of the servomotor controlling system, however, the loop gain for the speed control can not be made so high. As a result, a prolonged time is necessary to change the controlling voltage to a desired value, which leads to a time lag in the response. Also, the system becomes more sensitive to external disturbance.

SUMMARY OF THE INVENTION

It is accordingly a primary object of the present invention to provide a servomotor controlling system which assures improved follow-up characteristics of a servomotor and which effectively prevents oscillation of the servomotor when it is to be stopped.

Briefly, in accordance with one preferred form of the present invention, there is provided a control system for a servomotor, comprising:

means for producing a driving speed controlling signal to be applied to the servomotor;

means for producing a driving amount controlling signal to be applied to the servomotor; and signal controlling means for controlling the state of transmission of the driving speed controlling signal and the driving amount controlling signal to the servomotor, said signal controlling means being effective to establish a first transmission state in which at least the driving speed controlling signal can be transmitted to the servomotor with a predetermined amplification rate and a second transmission state in which the driving speed controlling signal can be transmitted to the servomotor with an amplification rate smaller than said predetermined amplification rate while the driving amount controlling signal can be transmitted to the servomotor with a predetermined amplification rate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

In one preferred form, the present invention is applied to a servomotor controlling system wherein a servomotor is driven, until an object being moved by the servomotor reaches a position in the neighborhood of a desired stop position, while using, as a motor controlling voltage, the difference between a speed instructing voltage as set by a system controller and a current motor-speed voltage obtained by frequency-to-voltage conversion of a feedback pulse train from a digital encoder mounted to the servomotor. When the object reaches that position, the controlling mode is changed to a position controlling mode using a differential counter. In accordance with the one preferred form of the present invention, the gain of the speed feedback loop is changed at the time of changeover of the control mode, from the speed controlling mode to the position controlling mode.

This will now be described in more detail, taken in conjunction with FIGS. 2A-2C wherein the invention is applied to the control of a linear type servomotor which is used to move a scanning slider employed in a mirror projection type exposure apparatus.

Figure 2A:
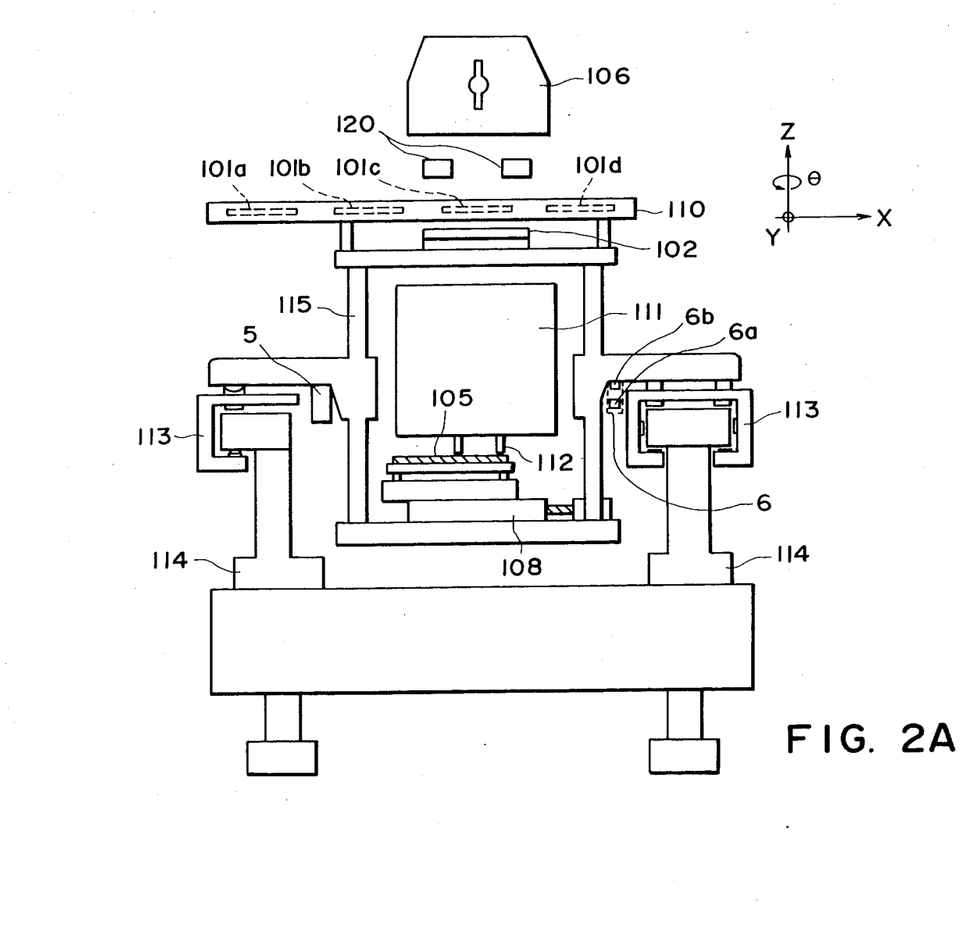
FIG. 2A is a schematic view showing a general arrangement of a microcircuit manufacturing exposure apparatus into which a servomotor controlling system according to one embodiment of the present invention is incorporated.
Figure 2B:
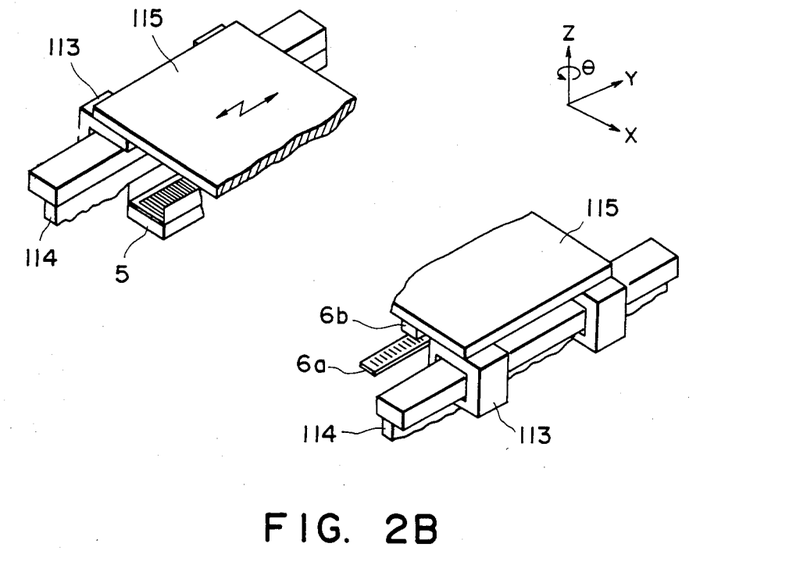
FIG. 2B is a fragmentary perspective view of a guide portion of the exposure apparatus of FIG. 2A.

Referring first to FIG. 2A, there is shown a mirror projection type exposure apparatus usable in the manufacture of microcircuits, more particularly circuit patterns to be used in liquid crystal panel display devices. A servomotor controlling system according to one embodiment of the present invention is incorporated into this exposure apparatus.

In FIG. 2A, the apparatus is used with four masks 101a, 101b, 101c, and 101d. Each of the masks has formed thereon an individual circuit pattern for the manufacture of semiconductor devices, or an individual pattern for the manufacture of flat panel display devices such as liquid crystal display devices. Where the liquid crystal display devices are to be manufactured, each of the masks 101a, 101b, 101c, and 101d may be formed with a pattern having a portion for forming plural picture elements in the liquid crystal display device and a portion for forming a driving circuit for driving the picture elements. A glass plate 105 is a base member for a flat panel liquid crystal display device, in this embodiment. For the manufacture of the display device, a pattern corresponding to a number of picture elements and the same number of switching transistors each being operationally associated with one of the picture elements to control actuation and de-actuation of the same picture element is to be formed on the glass base plate by a photolithographic process which is known per se. The glass base plate 105 has a square or oblong shape having a length, in the diagonal direction, of an order of 14 inches. While not shown in the drawing, the glass base plate 105 is coated with a photoresist or photosensitive material.

The exposure apparatus further includes an illumination optical system 106 for irradiating one of the masks 101a, 101b, 101c, and 101d as placed at the exposure station with a predetermined wavelength of light supplied from an unshown light source. By irradiating the mask placed at the exposure station with light, corresponding one of portions or areas of the photosensitive layer on the glass base plate 105 is exposed to the light passed through the mask, such that the pattern of the mask is transferred onto the one portion of the glass base plate 105. A stage 108 is adapted to hold thereon the substrate or base plate 105. Also, the stage 108 is adapted to move the base plate 105 in each of X, Y, Z and θ directions. By the stage 108, the base plate 105 is stepwisely moved in the X and/or Y direction so that a desired one of unexposed portions of the base plate 105 is opposed to one of the masks 101a, 101b, 101c, and 101d as placed at the exposure station. The displacement of the stage 108 for moving the base plate 105 is controlled by a fine measuring system using an unshown laser interferometer unit.

The exposure apparatus further includes a mask plate 110 which is arranged to sequentially supply the masks 101a-101d to a mask stage 102. The apparatus further includes a known type mirror projection system 111 comprising a combination of concave and convex mirrors adapted to project, at a unit magnification in this embodiment, a pattern of one of the masks 101a–101d which is held at the predetermined position by the mask stage 102, onto the base plate 105 held on the stage 108. Mounted on a lower portion of the projection system 111 are gap sensors 112 for detecting the distance between a focal plane of the projection system 111 and the surface of the substrate 105. Each of the gap sensors 112 comprises an air-microsensor. It is a possible alternative to use a photoelectric sensor for detecting a light reflected from the substrate 105, thereby to detect the distance or interval between it and the focal plane of the projection system 111. By the provision of plural gap sensors 112, the distance from the substrate 105 surface to the focal plane of the projection system 111 is detected with respect to plural points on the substrate 105 surface. Linear air-bearing units 113—113 are movable along respective guide rails 114—114 each extending in the Y direction (a direction perpendicular to the sheet of FIG. 2A). One of the linear air-bearing units 113—113 is of a type wherein displacement in each of the X and Z directions is restrained, while the other is of a type wherein displacement in the Z direction is restrained. The projection system 111 has an optical axis which is in alignment with the optical axis of the illumination system 106.

The exposure apparatus further includes a holder 115 for holding, in a predetermined interrelation, the mask stage 102, the stage 108 for the substrate, and the mask plate 110. The holder 115 is supported by the linear air-bearing units 113—113, such that one of the masks 101a–101d as carried by the mask stage 102 and the substrate 105 carried on the stage 108 are movable as a unit relative to the projection system 111.

As will be described later in more detail with reference to FIG. 2C, the exposure apparatus further includes a servomotor 5 which is of linear type in this embodiment, as well as a control system therefor which comprises a digital encoder 6 also of linear type. The servomotor 5 has a slider portion (not shown) which is fixedly secured to the holder 115. The encoder 6 includes a scale portion 6a and a scale detecting portion 6b (FIG. 2B). The scale detecting portion 6b is fixedly secured to the holder 115. The servomotor 5 has a stator portion which, together with the scale portion 6a of the encoder 6, is held in a fixed positional relation with the mirror projection system 111. From the scale detecting portion 6b, feedback signals for the position control and the speed control are produced.

Denoted in FIG. 2A at numerals 120 are alignment detecting portions of known type, usable for aligning one of the masks 101a, 101b, 101c, and 101d, held on the stage 102, with one of the four areas of the substrate 105 which is going to be exposed.

In operation of the exposure apparatus, a first mask such as at 101a is placed on the mask stage 102 by means of a mask supply or changer system including the mask plate 110. Subsequently, the mask stage 102 now carrying thereon the mask 101a is moved in the X, Y, Z and θ directions by means of an unshown driving unit, so as to accurately place the mask 101a at the exposure station which is predetermined. This is called "mask alignment". Simultaneously with such mask alignment, the substrate 105 is moved by the stage 108 relative to the holder 115 so that the first, unexposed area of the substrate 105 is accurately positioned at the exposure station at which the pattern of the mask 101a is to be projected by the mirror projection system 111. The displacement of the substrate 105 is controlled very accurately by means of an unshown laser interferometer.

Thereafter, the servomotor 5 operates to move the holder 115 so as to place and position the same, allowing the alignment detecting portions 120 to detect alignment marks formed on the mask and the substrate. Such positioning of the holder 115 is executed on the basis of preparatorily stored positional information concerning the locations of the alignment marks of the mask and the substrate.

Before such alignment detection, focusing may be executed. For this purpose, an unshown Z-axis driving system of the stage 108 is actuated on the basis of the information about the distance between the focal plane of the projection system 111 and the surface of the substrate 105 as detected by the gap sensors 112—112 with respect to plural points on the substrate 105 surface. By this, the surface of the first area of the substrate 105 is accurately brought into coincidence with the focal plane of the projection system 111. This is called "Z-axis alignment" or "focusing". Upon completion of the Z-axis alignment, the alignment marks formed on the mask 101a and the alignment marks formed on the first area of the substrate are observed simultaneously by the alignment detecting system and by way of the projection system 111. In accordance with output signals from the alignment detecting system, representing the positional relation between the mask 101a and the first area of the substrate 105, the substrate 105 is moved by the stage 108 in appropriate one or ones of the X, Y and θ directions until the alignment marks of the mask and the substrate are brought into a superposed relation.

Upon completion of mask-to-substrate alignment, the illumination system 106 illuminates the mask 101a. More specifically, the illumination system 106 defines on the surface of the mask 101a an illumination area of an arcuate shape. This is to meet the shape of the optimum imaging region as defined in the mirror projection system 111. As the illumination system defines the arcuate illumination area on the surface of the mask 101a, the holder 115 is moved by the servomotor in the Y direction at a constant speed, while being guided by the linear air-bearing units 113—113. By this, the mask 101a and the first area of the substrate 105 are moved as a unit relative to the projection system 111 and, therefore, relative to the arcuate illumination area defined by the illumination system. As a result, the first, unexposed area is scanningly exposed to the light beam passed through the pattern of the mask 101a which is scanned by the light beam having an arcuate shape in cross-section. Consequently, upon completion of scanning exposure of the first area, the whole of the pattern of the mask 101a is transferred onto this area.

Upon completion of transfer of the pattern onto this area, the holder 115 is stopped while the stage 108 and the mask plate 110 are actuated again so as to move the next unexposed area of the substrate 105 to the exposure station (the pattern projection station of the projection system 111) and to replace the mask 101a on the mask stage 102 by the second mask 101b.

Thereafter, holder 115 is moved by the servomotor 5 so as to place and position the same, to allow the alignment detecting portions 120 to detect the alignment marks formed on the mask 101b and the second area of the substrate 105. Subsequently, similar operations as described hereinbefore are repeated and the pattern of the second mask 101b is transferred onto the second area, having been unexposed, of the substrate 105. In this manner, all the four areas of the substrate 105 are exposed to the mask patterns of the masks 101a, 101b, 101c, and 101d in sequence. All the operations described above are executed under the control of the system controller 1 (FIG. 2C).

Figure 2C:
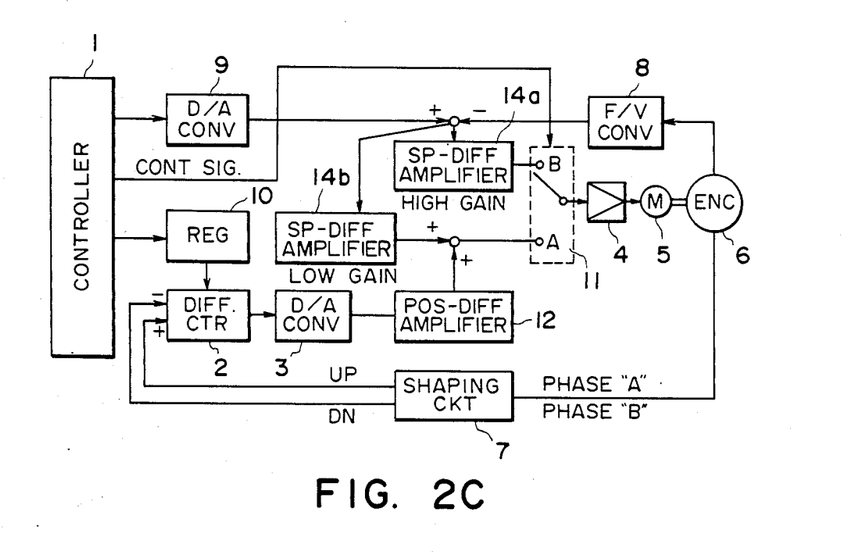
FIG. 2C is a block diagram of a servomotor controlling system according to an embodiment of the present invention.

FIG. 2C is a block diagram of the servomotor controlling system included in the exposure apparatus of FIG. 2A. In FIG. 2C, like numerals as of the FIG. 1 arrangement are assigned to similar or corresponding elements. In the control system of the FIG. 2C embodiment, as seen from the drawing, the speed-error amplifier 13 of the FIG. 1 arrangement used in both the speed controlling mode and the position controlling mode is replaced by first and second speed-error amplifiers 14a and 14b. The first speed-error amplifier 14a is arranged to be used exclusively in the speed controlling mode while, on the other hand, the second speed-error amplifier 14 is arranged to be used in the position controlling mode in order to provide the position controlling system with "viscosity" or "resistance". Further, in the present embodiment, the first speed-error amplifier 14a has a gain higher than that of the speed-error amplifier 13 of the FIG. 1 arrangement, while the second speed-error amplifier 14b has a gain lower than that of the first speed-error amplifier 14a. Thus, the control system is arranged so that the gain of the speed feedback loop can be changed in accordance with the mode of controlling operation as desired.

The operation of the control system of the FIG. 2C embodiment will now be described in detail.

From the start position to the servo-mode changing position, the controller 1 operates to cause, with the aid of a control signal, the analog switch 11 to select the terminal B, whereby the driving speed of the servomotor 5 is controlled only with the speed feedback. To assure improved response characteristics in such speed controlling mode, the first speed-error amplifier 14a may preferably have the highest gain that does not cause undamped speed vibration which makes the control system unstable. Such maximum value for the gain of the speed-error amplifier 14a may be determined preparatorily from the weight of the holder, the characteristics of the servomotor used, etc. and on the basis of simulations. By making the gain of the amplifier 14a high or highest, the speed control with improved follow-up characteristics is attainable.

When the servo-mode changing position is reached, the controller 1 operates to cause the analog switch 11 to select the terminal A, whereby the position controlling mode is established. In this position controlling mode, as described hereinbefore, the speed feedback is incorporated into the position controlling system as the "phase compensation means" so as to make the same stable. Since, however, the first speed-error amplifier 14a has a higher gain, the speed-error voltage when it is applied to this amplifier 14a will be amplified at a higher amplification rate. Accordingly, if the output of the first speed-error amplifier 14a is incorporated into the position feedback loop, the gain of the first speed-error amplifier 14a is too high so that the servomotor will oscillate undesirably. To avoid this, the second speed-error amplifier 14 having a lower gain is used to incorporate the speed feedback into the position feedback loop, thereby to ensure stable and quick position control. Thus, the gain of the second speed-error amplifier 14b is predetermined so that the speed-error voltage as outputted therefrom provides the position feedback loop with a suitable amount of "viscosity" or "resistance". Preferably, the second speed-error amplifier 14b may have a gain that reduces the speed feedback loop gain to a value approximately equal to one-third of the position feedback loop gain.

Figure 3:
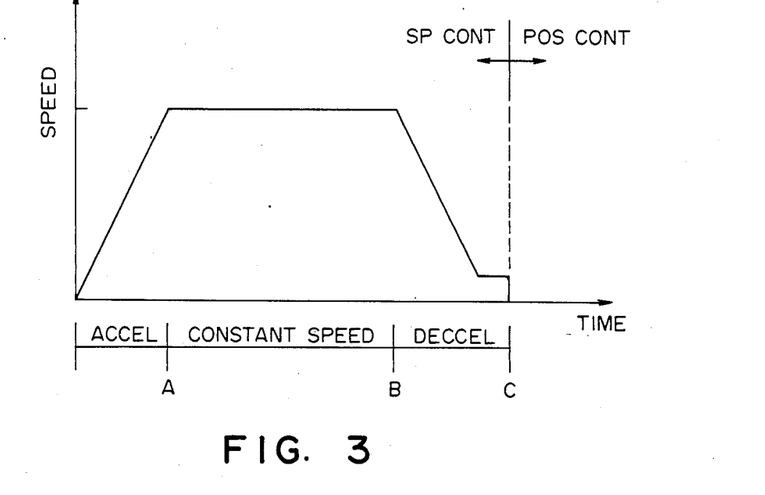
FIG. 3 is a graph showing a speed pattern or profile as controlled by the controlling system of FIG. 2C.

FIG. 3 shows the waveform of the output from the D/A converter 9, which is an example of the velocity profile as instructed by the system controller 1 of the FIG. 2C embodiment. At the time of speed control, generally the acceleration/deceleration control as depicted in this Figure is executed. The exposure operation and the movement of the holder 115 (FIGS. 2A and 2B) are controlled so that the "scanning exposure" is carried out during the constant-speed period A-B in FIG. 3. In the control system of the FIG. 2C embodiment, the speed controlling mode is switched to the position controlling mode at time C which is the point of termination of the speed control, and, simultaneously therewith, the second speed-error amplifier 14b is selected in place of the first speed-error amplifier 14a.

Figure 4:
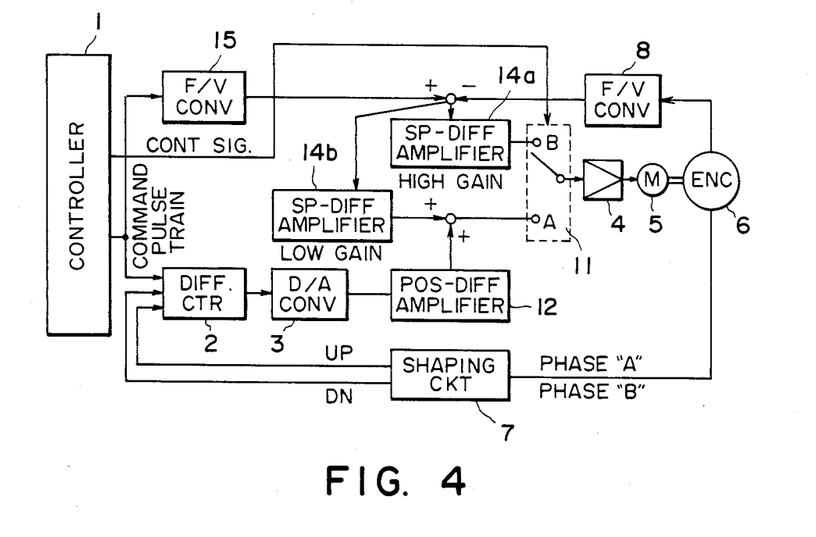
FIG. 4 is a block diagram of a servomotor controlling system according to another embodiment of the present invention.

Referring now to FIG. 4, description will be made to a servomotor controlling system according to another embodiment of the present invention. In FIG. 4, like numerals as of the FIG. 2C embodiment are assigned to similar or corresponding elements. Denoted at 1 is a system controller which, in this embodiment, is arranged to produce command pulse trains as well as control signals for changing the control mode. Denoted at 15 is a frequency-to-voltage converter (hereinafter "F/V converter").

As compared with the FIG. 2C embodiment, the control system of the present embodiment is arranged so that command pulse trains are produced from the controller 1. That is, the speed instructing voltage is obtainable by converting with the F/V converter 15 the frequency of a command pulse train into an electric voltage. Also, the drive-amount instructing data is obtainable by counting with the differential counter 2 the number of pulses in the command pulse train. Except for these points, the manner of speed/position controlling operation of the present embodiment is the same as that of the FIG. 2C embodiment.

It is to be noted with reference to the present embodiment that, in the speed controlling mode during which high-frequency pulse trains are produced, the signals from the D/A converter, with which "glitch" is liable to occur during the processing of such high-frequency pulses, are not used and, in place thereof, only the signals from the F/V converter which is stable in respect to high-frequency pulses are used. Also, in the position controlling mode wherein low-frequency pulse trains are produced, only a small proportion of the signals from the F/V converter, with which "ripple" is liable to occur in regard to such low-frequency pulses, is used while, on the other hand, the signals from the D/A converter which is stable in regard to the low-frequency pulses are used in a larger proportion. With this arrangement, stable control is attainable both in the speed controlling mode and in the position controlling mode.

Figure 5:
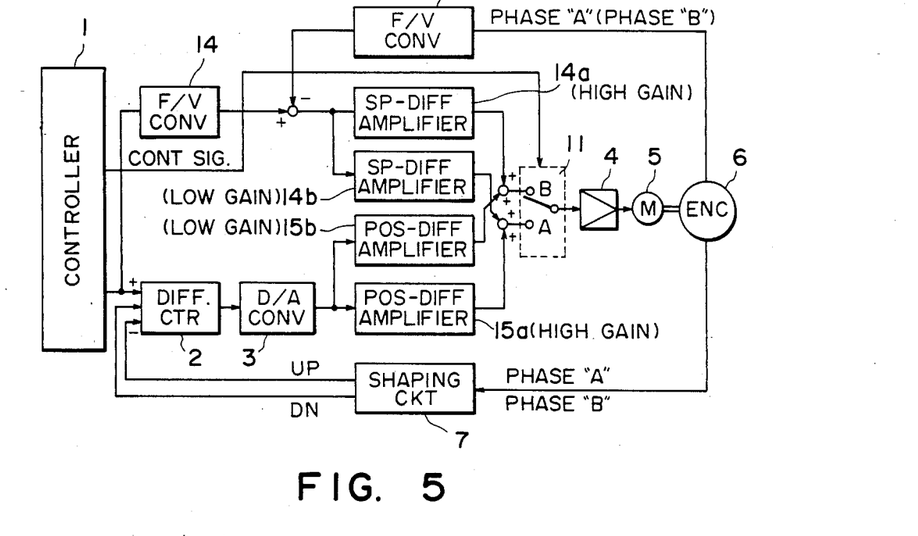
FIG. 5 is a block diagram of a servomotor controlling system according to a further embodiment of the present invention.

Referring now to FIG. 5, there is shown a servomotor controlling system according to a further embodiment of the present invention. In FIG. 5, like numerals as of the foregoing embodiments are assigned to similar or corresponding elements.

In the control system of the present embodiment, as compared with the FIG. 4 embodiment, the positional-error amplifier 12 of the FIG. 4 embodiment is omitted and, in place thereof, first and second positional-error amplifiers 15a and 15b are used. The first positional-error amplifier 15a is provided to be used for the amplification of position controlling signals in the position controlling mode while, on the other hand, the second positional-error amplifier 15b is provided to be used in the speed controlling mode in order to produce signals effective to correct or reduce the positional error. The first positional-error amplifier 15a has a gain higher than that of the positional-error amplifier 12 of the FIG. 4 embodiment, and the second positional-error amplifier 15b has a gain lower than that of the first positional-error amplifier 15a. Also, the first speed-error amplifier 14a has a higher gain, while the second speed-error amplifier 14b has a lower gain, as in the foregoing embodiment. Thus, the control system is arranged such that both the speed feedback loop gain and the position feedback loop gain can be changed in accordance with the control mode as desired.

The operation of the control system of the FIG. 5 embodiment will be described in detail.

From the start position to the servo-mode changing position, the controller 1 operates to cause, with a control signal, the analog switch 11 to select the terminal B. By this, the speed controlling mode is established. In this speed controlling mode, the first speed-error amplifier 14a having the highest gain, that does not cause undamped oscillation of the control system as well as the second positional-error amplifier 15b having a lower gain are used so as to amplify the speed-error voltage and the positional-error voltage, respectively. The outputs of these amplifiers are added to each other, and the servomotor 5 is driven in response to the resultant voltage.

If, in the speed controlling mode, the loop gain of the position feedback loop to be incorporated is too high, there is a high possibility that the driving speed of the servomotor vibrates or fluctuates, with the result that the exposure becomes uneven. To prevent this, the loop gain of the position feedback loop is reduced sufficiently. While it may depend on the exposure conditions, the sensitivity of a resist material used, etc., preferably the loop gain of the position feedback loop is in an order of one-tenth of the loop gain of the speed feedback loop. By doing so, speed vibration causing uneven exposure can be avoided effectively.

This important feature of the present embodiment will now be described in more detail. In the arrangement shown in FIG. 1, only the driving speed of the servomotor is controlled in the speed controlling mode. That is, the speed servo control is terminated at a moment at which the object being driven by the servomotor should have reached at the desired position in accordance with calculations. With only such speed control, however, it is not easy to ensure that the distance of movement of the object exactly coincides with the distance from the start position to the desired position. Accordingly, there is a high possibility that, at the time of completion of the speed servo control, the object is at a position deviating remarkably from the desired position. If this occurs, the position servo control must be executed through an unnecessarily long distance, which causes enormous oscillatory movement of the object in the neighborhood of the desired position during a time period from start of the position servo control to the "stoppage". This leads to prolongation of the position controlling time.

In accordance with the FIG. 5 embodiment, as compared therewith, the position feedback voltage, while it is not so high, is used in the speed servo control mode. By doing so, the drive amount of the servomotor can be controlled at every moment during the speed servo control, although the controlled amount is not so large. With this arrangement, any positional error at every moment during the speed servo control can be corrected or reduced by changing the motor driving speed in accordance with the applied position feedback voltage. Therefore, at the time of changeover of the control mode to the position controlling mode, there would not easily occur any positional error such that the position servo control can be initiated accurately in close proximity to the desired position. As a result, undesirably large oscillatory movement can be prevented and, thus, the position servo control can be accomplished in a reduced time. Also, it is possible to avoid or suppress speed variation in the holder 115 movement which may be caused due to flexure of the guide member or for any other reason, the variation itself having independent of the driving speed of the servomotor.

After the servo control mode changing position is reached, the controller 1 operates to cause, with a control signal, the switch 11 to select the terminal A, whereby the position controlling mode is established. In this position controlling mode, the first positional-error amplifier 15a having a highest gain that does not make the control system unstable as well as the second speed-error amplifier 14b having a gain reduced to an order of one-third of the loop gain of the position feedback loop, are used to amplify the positionl-error voltage and the speed-error voltage, respectively. The outputs of these amplifiers are added to each other, and the position servo control is executed in accordance with the resultant voltage. By incorporating the speed feedback signal into the position feedback loop with the decreased gain of the second speed-error amplifier 14b, also the position control system can be made stable.

Figure 6:
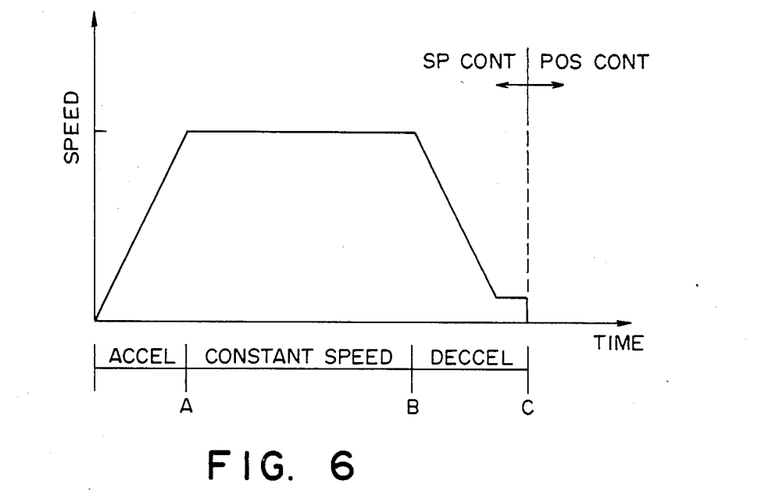
FIG. 6 is a graph showing a speed pattern or profile as controlled by the controlling system of FIG. 5.

FIG. 6 shows an output waveform of the F/V converter 14, as an example of a velocity profile as instructed from the system controller 1. Generally, in the speed controlling mode, acceleration/deceleration control as depicted in this Figure is executed. In accordance with the present embodiment, the speed controlling mode is changed to the position controlling mode at time C and, simultaneously therewith both the speed feedback loop gain and the position feedback loop gain are changed, respectively.

Figure 7:
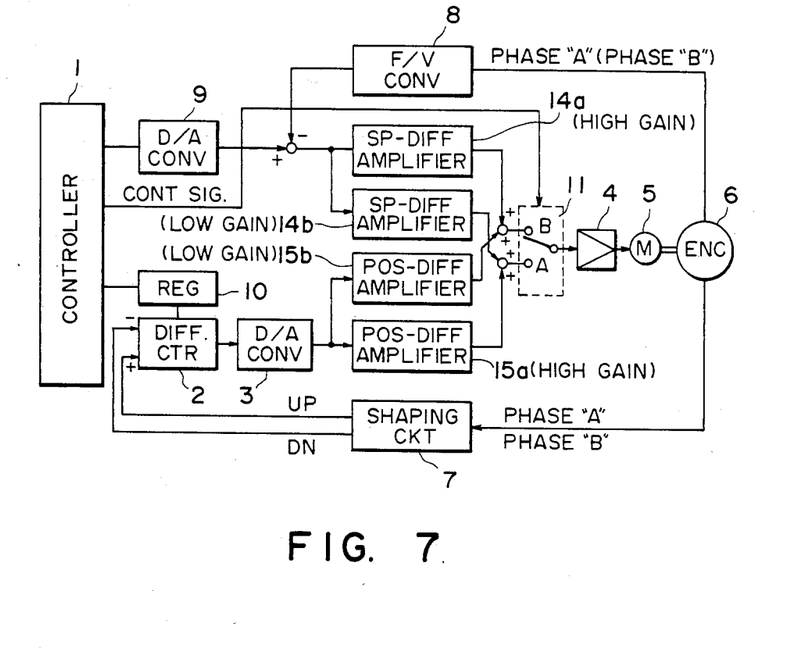
FIG. 7 is a block diagram of a servomotor controlling system according to a still further embodiment of the present invention.

FIG. 7 shows a servomotor controlling system according to a still further embodiment of the present invention. In FIG. 7, like numerals as of the foregoing embodiments are assigned to similar or corresponding elements. As compared with the FIG. 5 embodiment, the control system of the present embodiment includes a system controller 1 which is arranged to independently set the speed instructing data and the target position data (data concerning a desired stop position). More specifically, the speed instructing signals from the controller 1 is converted into a variable speed-instructing voltage by the D/A converter 9. On the other hand, as for the target position data, the controller 1 operates to set, in the target position register 10, the data concerning positions which should be assumed by the object at respective moments. By means of the cooperative arrangement of the register 10 and the differential counter 2, any error or difference between the instructed amount of drive of the servomotor and the actual amount of drive having been accomplished by the servomotor, is detected. Except for these points, the manner of speed/position controlling operation of the present embodiment is the same as that of the foregoing embodiment.

While, in the present embodiment, a digital encoder is used to detect the amount of drive of the servomotor as well as the driving speed of the servomotor (the latter being detected by way of the F/V converter 8), the driving speed may be detected directly by use of a tachometer generator where the servomotor used is of a rotary type.

Further, it is possible that, in a case where the instructed speed is low, improved follow-up characteristics are attainable by driving the servomotor only with the position feedback. In view of this, the control system may be arranged such that, when the instructed speed is not greater than a predetermined value, the servomotor drive is executed only with the use of the dominant position-feedback control described hereinbefore.

For example, where the slider 115 is to be moved to the mask-to-substrate alignment detecting position or the gap detecting position, the system controller 1 may discriminate where the instructed maximum driving speed for moving the slider 115 is not greater than a predetermined value, and, if not greater, may operate to cause the switch 11 to select the terminal A initially from the start of operation, so that the servomotor is driven in the position servo control mode from its start of operation. Suitable velocity profile and speed instructing signals according to such profile can be determined from the distance of movement necessary for moving the slider 115 to the alignment detecting position or the gap detecting position and on the basis of simulations.

In accordance with the present embodiment, as described hereinbefore, both the speed feedback loop gain and the position feedback loop gain are changed in accordance with the control mode as desired. By this, improved follow-up characteristics are attainable during the acceleration period. Further, undesirable oscillatory movement of the object in the position servo control mode can be made minimum.

While the invention has been described with reference to the structures disclosed herein, it is not confined to the details set forth and this application is intended to cover such modifications or changes as many come within the purposes of the improvements or the scope of the following claims.

What is claimed is:

1. A control system for controlling a servomotor in a speed controlling mode and in a position controlling mode, said system comprising:
    first signal producing means for producing an actual speed signal related to the actual speed of the servomotor;
    second signal producing means for producing a speed instructing signal to be applied to the servomotor;
    third signal producing means for producing a driving amount instructing signal to be applied to the servomotor; and
    control means for controlling signal transmission to the servomotor, said control means including an amplifying means for amplifying said actual speed signal, said speed instructing signal and said driving amount signal, wherein said control means is operable in the speed controlling mode to transmit, to the servomotor and at a first predetermined amplification rate, in accordance with said amplifying means, at least a signal formed by combining said actual speed signal from said first signal producing means and said speed instructing signal from said second signal producing means, and wherein said control means is operable in the position controlling mode to transmit, to the servomotor, a signal formed by combining first and second signals wherein the first signal is formed by amplifying, in accordance with said amplifying means, said driving amount instructing signal from said third signal producing means at a second predetermined amplification rate and wherein the second signal is formed by amplifying, in accordance with said amplifying means, at a third amplification rate which is lower than the first and second amplification rates, a signal obtained by combining said actual speed signal from said first signal producing means and said speed instructing signal from said second signal producing means.

2. A system according to claim 1, wherein in the speed controlling mode said driving amount instructing signal is also transmitted to the servomotor.

3. A system according to claim 2, wherein said driving amount instructing signal is , in accordance with said amplifying means, at a fourth amplification rate lower than the first amplification rate.

4. A system according to claim 3, wherein the fourth amplification rate is lower than the second amplification rate.

5. A control system for controlling a servomotor in a speed controlling mode and in a position controlling mode, said system comprising:
    first signal producing means for producing an actual speed signal related to the actual speed of the servomotor;
    second signal producing means for producing a drive instructing signal to be applied to the servomotor; and
    control means for controlling signal transmission to the servomotor, said control means including an amplifying means for amplifying said actual speed signal, said speed instructing signal and said driving amount signal, wherein said control means is operable in the speed controlling mode to transmit, to the servomotor and at a first predetermined amplification rate, in accordance with said amplifying means, at least a signal formed by combining said actual speed signal from said first signal producing means and said speed instructing signal from said second signal producing means, and wherein said control means is operable in the position controlling mode to transmit, to the servomotor, a signal formed by combining first and second signals wherein the first signal is formed by amplifying, in accordance with said amplifying means, said driving amount instructing signal from said third signal producing means at a second predetermined amplification rate and wherein the second signal is formed by amplifying in accordance with said amplifying means said actual speed signal from said first signal producing means at a third amplification rate which is lower than the first and second amplification rates.

6. A system according to claim 5, wherein in the speed controlling mode said driving amount instructing signal is also transmitted to the servomotor.

7. A system according to claim 6, wherein said driving amount instructing signal is amplified in accordance with said amplifying means at a fourth amplification rate lower than the first amplification rate.

8. A system according to claim 7, wherein the fourth amplification rate is lower than the second amplification rate.

9. A control system for controlling a servomotor in a speed controlling mode and in a position controlling mode, said system comprising:
   first signal producing means for producing a speed controlling signal to be applied to the servomotor;
   second signal producing means for producing a driving amount controlling signal to be applied to the servomotor; and
   signal controlling means for controlling signal transmission to the servomotor, said signal control means including an amplifying means for amplifying said speed controlling signal and said driving amount signal, wherein said controlling means is operable in the position controlling mode to transmit to the servomotor at least said driving amount controlling signal at a first predetermined amplification rate, in accordance with said amplifying means, and wherein said controlling means is operable in the speed controlling mode to transmit to the servomotor said speed controlling signal at a second predetermined amplification rate in accordance with said amplifying means, and said driving amount controlling signal at a third amplification rate, in accordance with said amplifying means which is lower than the second amplification rate.

10. A system according to claim 9, wherein in the position controlling mode said speed controlling signal is also transmitted to the servomotor.

11. A system according to claim 10, wherein the speed controlling signal is amplified in accordance with said amplifying means, at an amplification rate lower than the first amplification rate.

* * * * *

UNITED STATES PATENT AND TRADEMARK OFFICE
CERTIFICATE OF CORRECTION

PATENT NO. : 4,810,941

DATED : March 7, 1989

INVENTOR(S) : SHINJI OHISHI, ET AL.

It is certified that error appears in the above-identified patent and that said Letters Patent is hereby corrected as shown below:

COLUMN 10

Line 19, "having" should read --being--.

COLUMN 11

Line 46, "many" should read --may--.

COLUMN 12

Line 24, "is , in" should read --is amplified, in--.

Signed and Sealed this

Twenty-seventh Day of February, 1990

Attest:

JEFFREY M. SAMUELS

Attesting Officer   Acting Commissioner of Patents and Trademarks